May 29, 1928.  1,671,664
P. H. BAXTER
CULTIVATOR SHOVEL
Filed Nov. 5, 1926
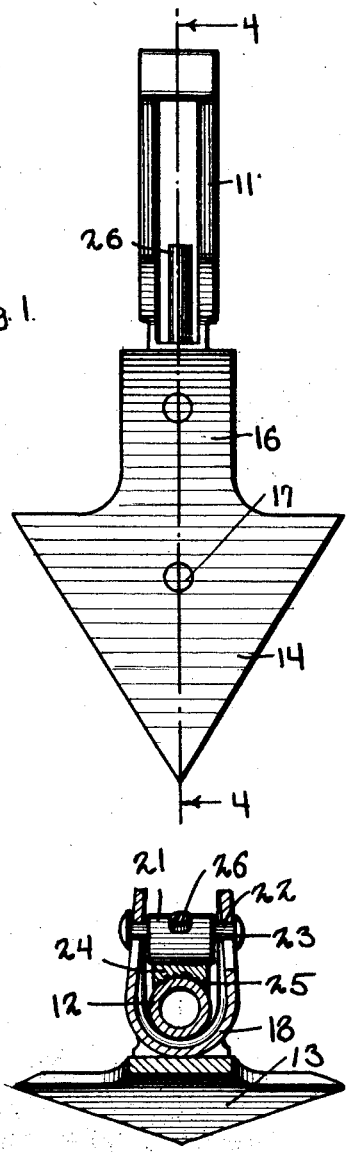
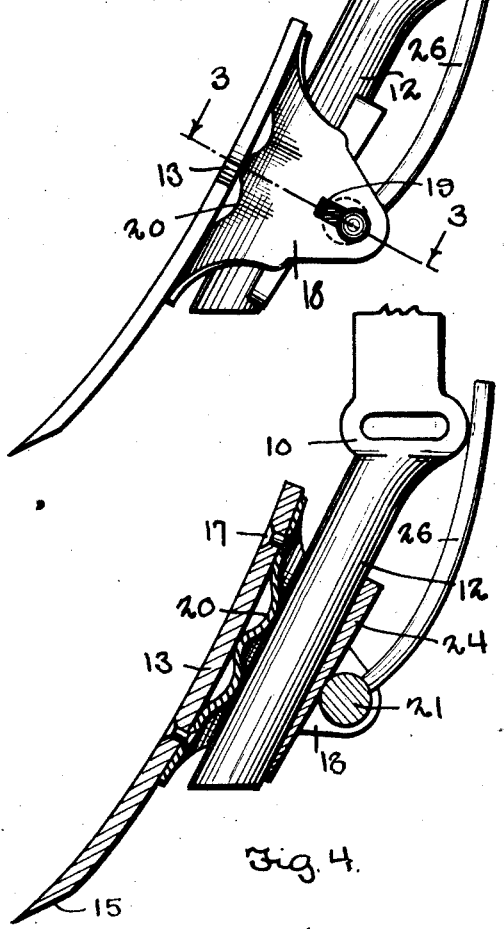
H. Baxter, Inventor
By Richard B. Owen
Attorney
Witnesses Patented May 29, 1928.

1,671,664

UNITED STATES PATENT OFFICE.

PHILLIP H. BAXTER, OF IOWA CITY, IOWA.

CULTIVATOR SHOVEL.

Application filed November 5, 1926. Serial No. 146,526.

The present invention relates to improvement in agricultural implements and has particular reference to improved cultivator shovel.

An important object of the invention is the provision of a cultivator shovel adapted for rapid and secure attachment upon a supporting shank.

A further object of the invention is the provision of a shovel supporting structure which will facilitate the connection of the implement upon the supporting shank of the cultivator.

Another object of the invention is the provision of a shovel attaching structure which may be conveniently secured in operative position without the use of tools.

Still another object of the invention is the provision of a cultivator shovel of the above character which is simple and durable of construction, efficient for the purpose intended and which can be manufactured at a relatively low cost.

Other objects and advantages of the invention will become apparent as the description progresses.

In the accompanying drawings forming a part of this specification, and in which like reference characters are employed to designate corresponding parts throughout the same:

Figure 1 is a front elevational view of the cultivator shovel shown in operative position upon a supporting shank, Figure 2 is a side elevational view illustrating the construction of my improved attaching device, Figure 3 is a transverse sectional view taken on line 3—3 of Figure 2 and Figure 4 is a vertical sectional view taken on the line 4—4 of Figure 1.

Referring to the drawing wherein for the purpose of illustration is shown the preferred embodiment of my invention, the numeral 10 generally designates a conventional type of cultivator shovel support embodying a U-shaped bracket 11 designed for detachable connection with the supporting arm of the cultivator and a tubular shank 12 formed at the lower end of the bracket extending at a forward angular position. As illustrated in Figures 2 and 4 the shank 12 is circular in cross-section and designed to readily engage a shovel supporting bracket.

It is customary at the present time to connect cultivator shovels and similar implements in position by means of supporting bracket tightly connected in position on the shank by a bolt and nut. This type of connection is objectionable in that it necessitates employment of a wrench to disconnect the implement, and the possibility of the bolt and nut thread becoming rusted, and consequently increasing the difficulty of disconnecting the same.

With this in mind, my invention is designed to produce a novel shovel attaching device which can be manually operated to lock the shovel in operative position on the supporting shank or release the same. The device comprises a shovel 13 formed of a durable metallic plate curved in a longitudinal arc and embodying a tapered shovel point at the lower end. The upper portion of the shovel is formed to provide a relatively narrow body 16.

Rigidly secured to the rear side of the shovel 13 by means of rivet 17 or in any similar manner is a U-shaped connecting bracket 18, the parallel side portions of the bracket being tapered and provided with elongated slots 19 adjacent the outer end.

The intermediate portion of the bracket 18 is corrugated as indicated in 20 for frictional engagement with the shank 12.

Mounted for oscillating movement in the outer end of the bracket 18 is a transverse shaft 21 circular in cross-section, the ends of the shaft 21 being machined to form reduced pins 22. An essential feature of the construction resides in having the reduced pins 22 arranged in positions on outer ends of the shaft 21 so as to project in an aligned position. The outer ends of the pins are upset to form heads 23 to prevent lateral movement of the shaft. From this construction it is apparent that shaft 21 is rotatably mounted in the outer ends of the bracket for eccentric movement. A wedge bar 24 is formed so as to be snugly inserted between the shaft 21 and the outer surface of the shank 12, this bar being generally rectangular in cross section and tapered longitudinally. Snugly fitted in a radial bore in the center of the eccentric shaft 21 and projecting outwardly therefrom is an arcuate lever 26 designed to permit convenient rotary movement of the eccentric.

In mounting the improved shovel structure in its position upon a supporting shank, the lever 26 is initially thrown to a downward position whereby the eccentric shaft will be disposed in an outwardly directed position. The shovel bracket is then slidably fitted on the shank and the wedge 24 inserted between the inner reduced portion of the eccentric shaft and the shank. The lever 26 is then swung upwardly to the position shown in Figure 2, causing the eccentric to be turned inwardly to tightly compress the wedge 24 and the shovel bracket in position on the shank 12. Thus, the shovel will be tightly secured in position upon the supporting shank for operative movement and arranged for simple and quick disconnection when desirable.

It is to be understood that the form of my invention herewith shown and described is to be taken as the preferred example of the same, and that various changes as to the shape, size and arrangement of parts may be resorted to without departing from the spirit of the invention or the scope of the subjoined claims.

Due to the tapered formation of the wedge 24, the shovel bracket can be detachably mounted on supporting shanks of varying diameter to permit application of the shovel bracket on different styles of machines.

Having thus described my invention, I claim:

1. In a cultivator shovel of the character described, and attaching means therefor, a shovel body, a bracket member of substantially U-shaped transverse sectional design having the yoke portion secured to the back of said body, and designed to receive a supporting shank between the legs thereof, an eccentric body rotatably mounted between the legs of the bracket body adjacent the outer ends thereof, designed, when rotated, to force a shank inwardly toward the yoke of the bracket, and means associated with the yoke portion of said bracket and acted upon by a shank member clamped therein, whereby a resilient clamping of the shank in the bracket will result.

2. In a cultivator shovel of the character described, and attaching means therefor, a shovel body, an attaching bracket secured to the back of said body and of substantially U shaped cross sectional design, an eccentric body rotatably mounted between the legs of said bracket member and designed to act against a supporting shank extended through the bracket, and means for setting up resilient frictional engagement between the bracket and a shank body and consisting of a plurality of corrugations formed in the bracket body between the same and the shovel body and extending at right angles to a shank member arranged in the bracket.

3. In a cultivator shovel and attaching means therefor, the combination with a shovel body, a substantially U-shaped bracket member having the yoke portion thereof relatively broad and provided with a plurality of transversely extending corrugations, said yoke portion being designed to be secured against the back of the shovel body with the leg portions thereof projecting at substantially right angles to the rear face of the body, an eccentric member pivotally mounted between the legs of said U-shaped bracket member, and a tapered wedge member having one face provided with a longitudinally extending curved recess provided with serrations in the face thereof for engagement with a supporting shank member extending through the bracket and having the outer face flat throughout and designed to be acted upon by said eccentric member to force a shank member inwardly against the corrugated surface of the bracket body.

4. A cultivator shovel and attaching structure therefor, comprising a shovel body, a bracket member secured to the back of said body to receive a supporting shank, a rotatable eccentric body carried by said bracket and designed to engage said shank extending therethrough, when rotated, and resilient means arranged between the back of said shovel and said shank and designed to be compressed upon actuation of said eccentric.

In testimony whereof I affix my signature.

PHILLIP H. BAXTER.